(12) United States Patent
Teng

(10) Patent No.: US 12,376,566 B1
(45) Date of Patent: Aug. 5, 2025

(54) PET TOY

(71) Applicant: Scent Trail Pet Toys, LLC, Spring, TX (US)

(72) Inventor: Jeremy W. Teng, Spring, TX (US)

(73) Assignee: Scent Trail Pet Toys, LLC, Spring, TX (US)

( * ) Notice: Subject to any disclaimer, the term of this patent is extended or adjusted under 35 U.S.C. 154(b) by 0 days.

(21) Appl. No.: 19/043,353

(22) Filed: Jan. 31, 2025

Related U.S. Application Data

(60) Provisional application No. 63/627,727, filed on Jan. 31, 2024.

(51) Int. Cl.
*A01K 15/02* (2006.01)

(52) U.S. Cl.
CPC ................... *A01K 15/025* (2013.01)

(58) Field of Classification Search
CPC ............................. A01K 15/025; A63F 9/0601
See application file for complete search history.

(56) References Cited

U.S. PATENT DOCUMENTS

| | | | |
|---|---|---|---|
| 4,161,284 A | 7/1979 | Rattan | |
| 5,640,931 A | 6/1997 | Markham | |
| 9,526,809 B2 | 12/2016 | Pizzini | |
| 9,756,835 B1* | 9/2017 | Ottosson | A01K 5/0135 |
| 10,791,710 B1* | 10/2020 | White | A01K 15/02 |
| 10,959,406 B2 | 3/2021 | Campbell et al. | |
| 11,272,690 B2 | 3/2022 | Gelardi, II | |
| 11,304,405 B2 | 4/2022 | Daley et al. | |
| 11,471,642 B2 | 10/2022 | Gornto | |
| 2010/0275855 A1* | 11/2010 | Ottosson | A63F 3/00 119/707 |
| 2011/0253059 A1* | 10/2011 | Wong | A01K 15/025 119/702 |
| 2014/0224185 A1* | 8/2014 | Hansen | A01K 15/025 119/710 |
| 2018/0206452 A1 | 7/2018 | Lai | |
| 2018/0368357 A1* | 12/2018 | Yang | A01K 15/025 |
| 2024/0016122 A1* | 1/2024 | Carmody, III | A01K 15/027 |
| 2024/0237612 A1* | 7/2024 | Hutton | A01K 5/0114 |
| 2024/0365751 A1* | 11/2024 | Wilson | A01K 15/025 |

* cited by examiner

*Primary Examiner* — Trinh T Nguyen
(74) *Attorney, Agent, or Firm* — Quisenberry Law PLLC

(57) ABSTRACT

Various embodiments of pet toys and serve capsules are disclosed. A pet toy may include a lower base including at least one serve capsule compartment for receiving a serve capsule containing scented items. A top plate may be secured to an upper surface of the lower base, and may include at least one slot corresponding to the at least one serve capsule compartment. A vented plate may be disposed between and rotatable relative to the lower base and the top plate. The vented plate may include a vented section that may be positioned above the at least one serve capsule. At least one inverted slidable cover may be slidably retained between the top plate and the vented plate for slidable movement along the at least one slot in the top plate and may be positioned above the at least one serve capsule compartment.

18 Claims, 8 Drawing Sheets

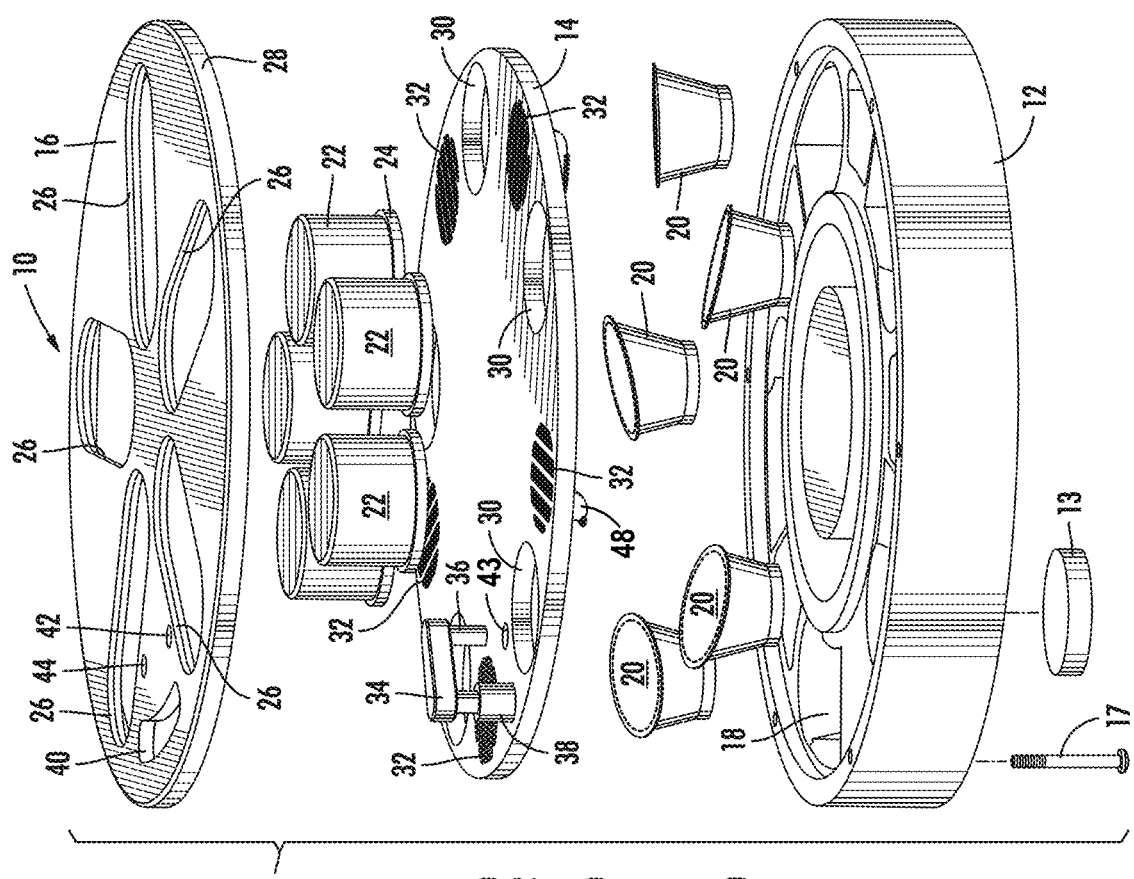
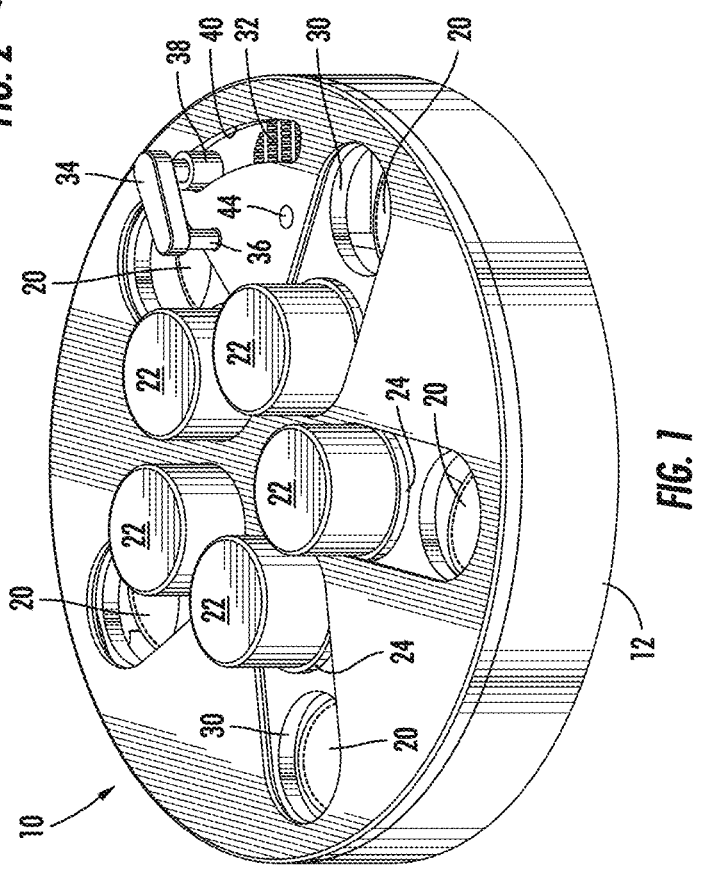

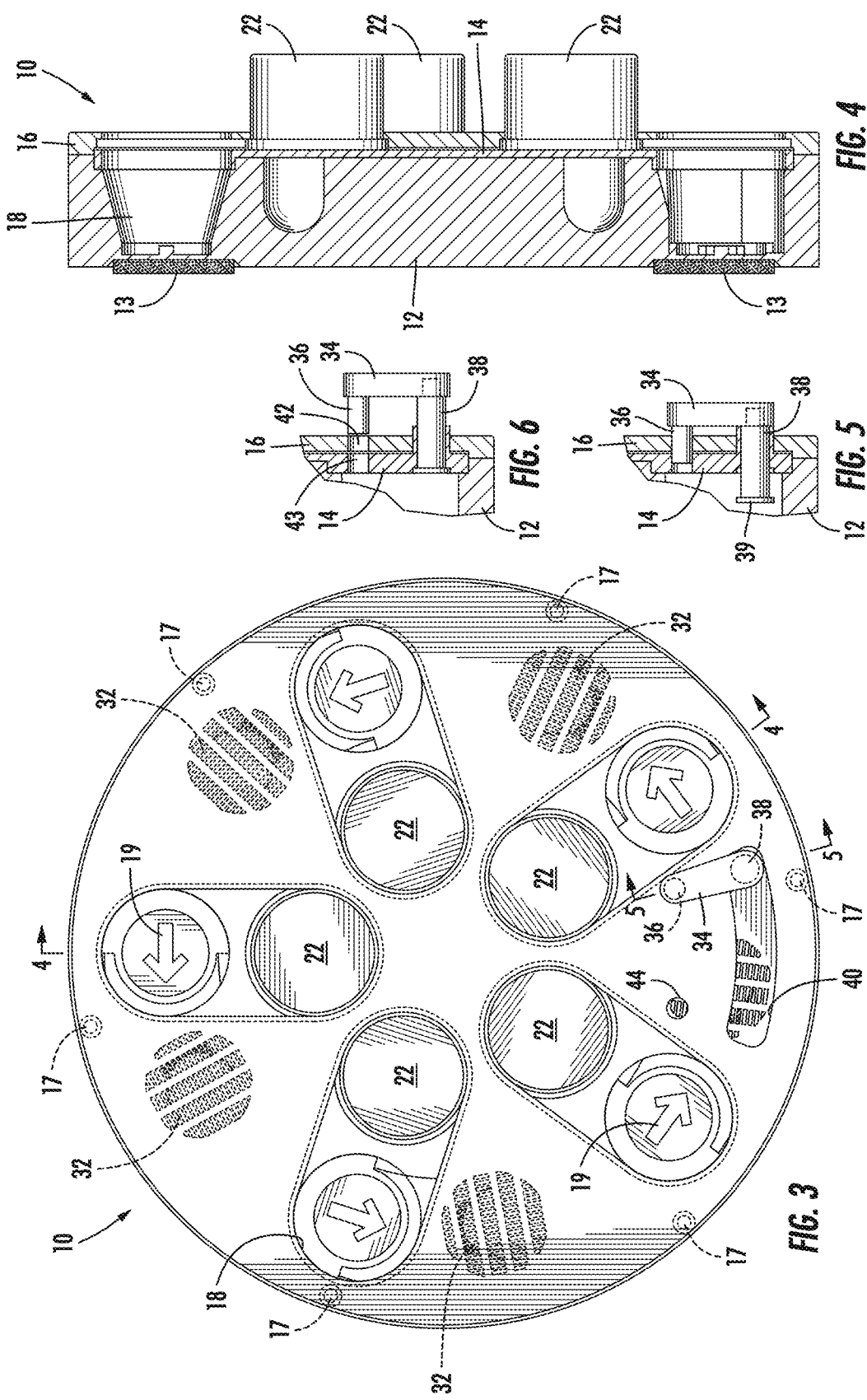

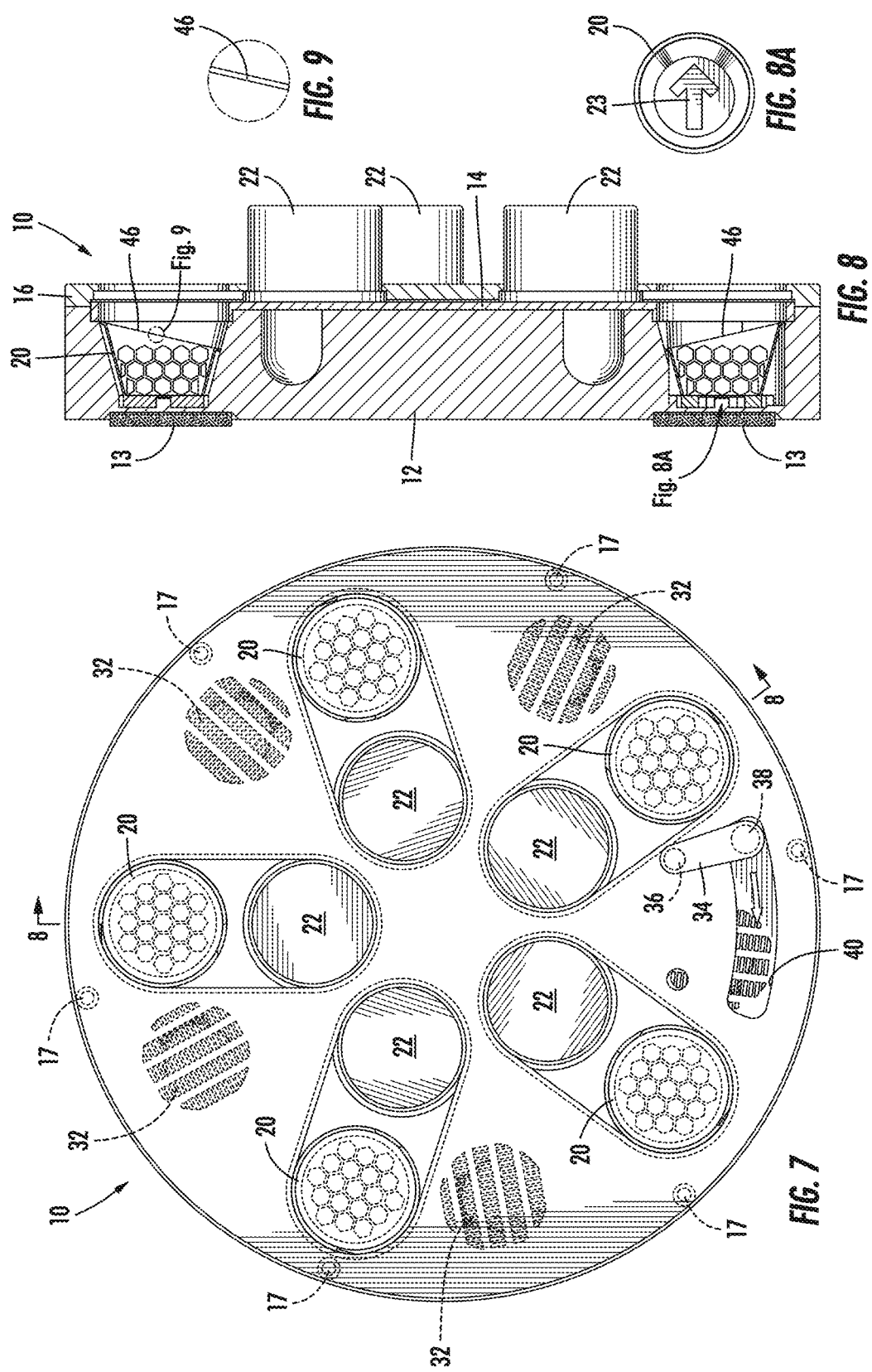

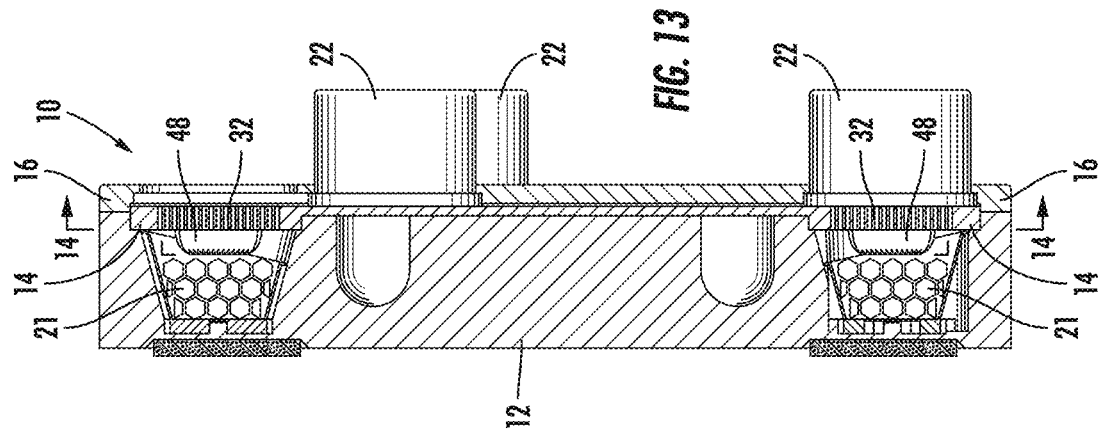
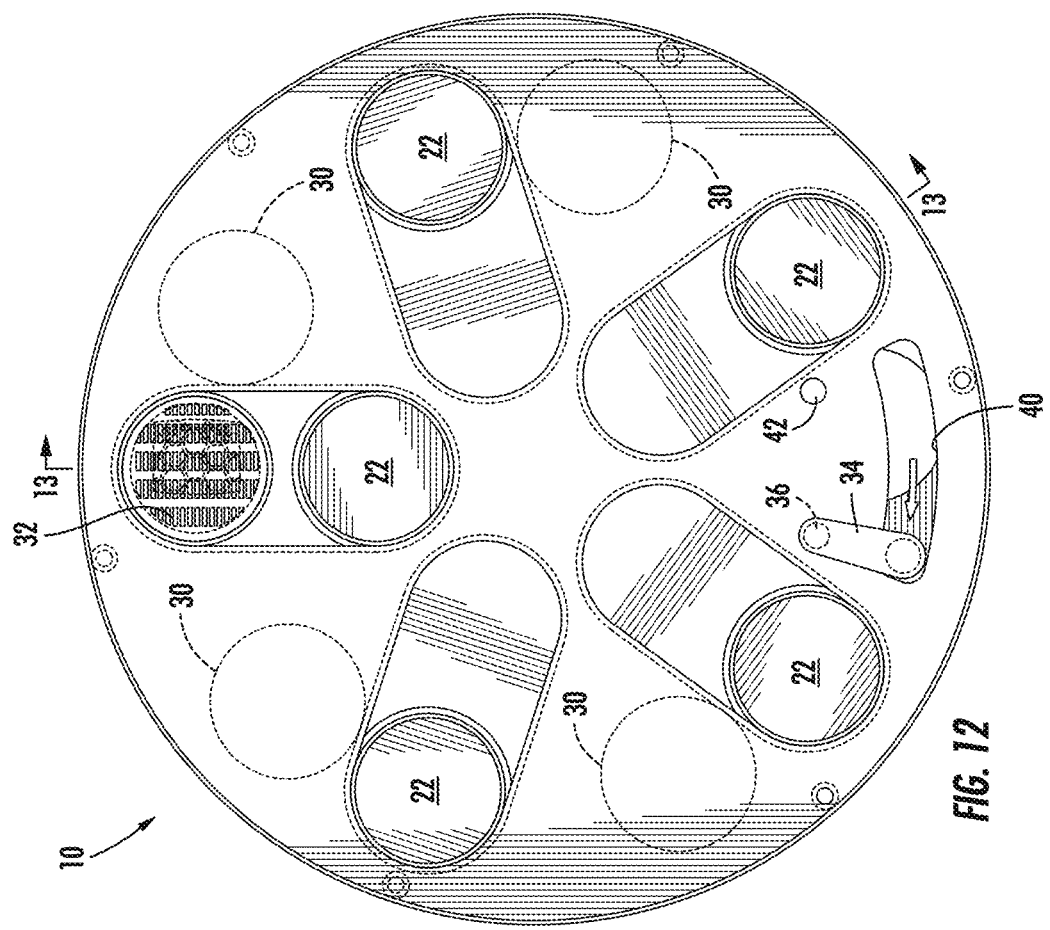

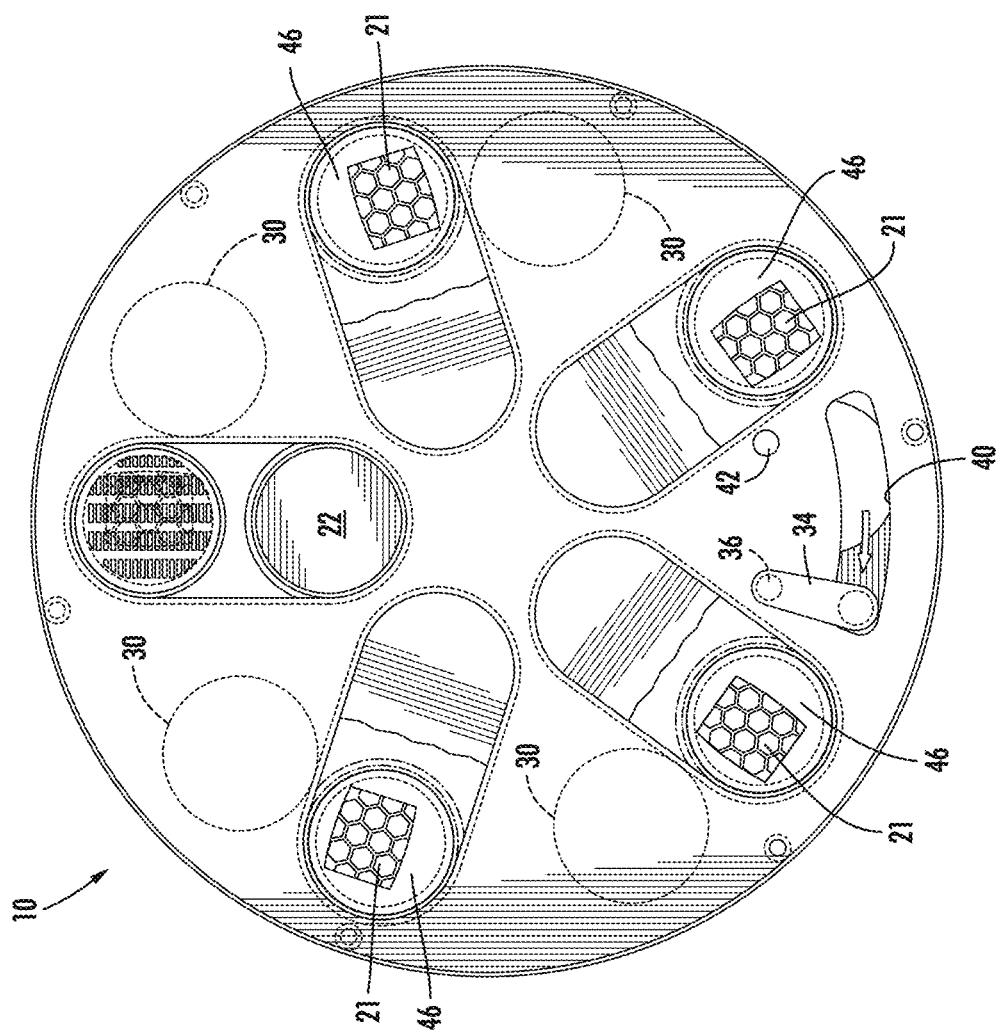

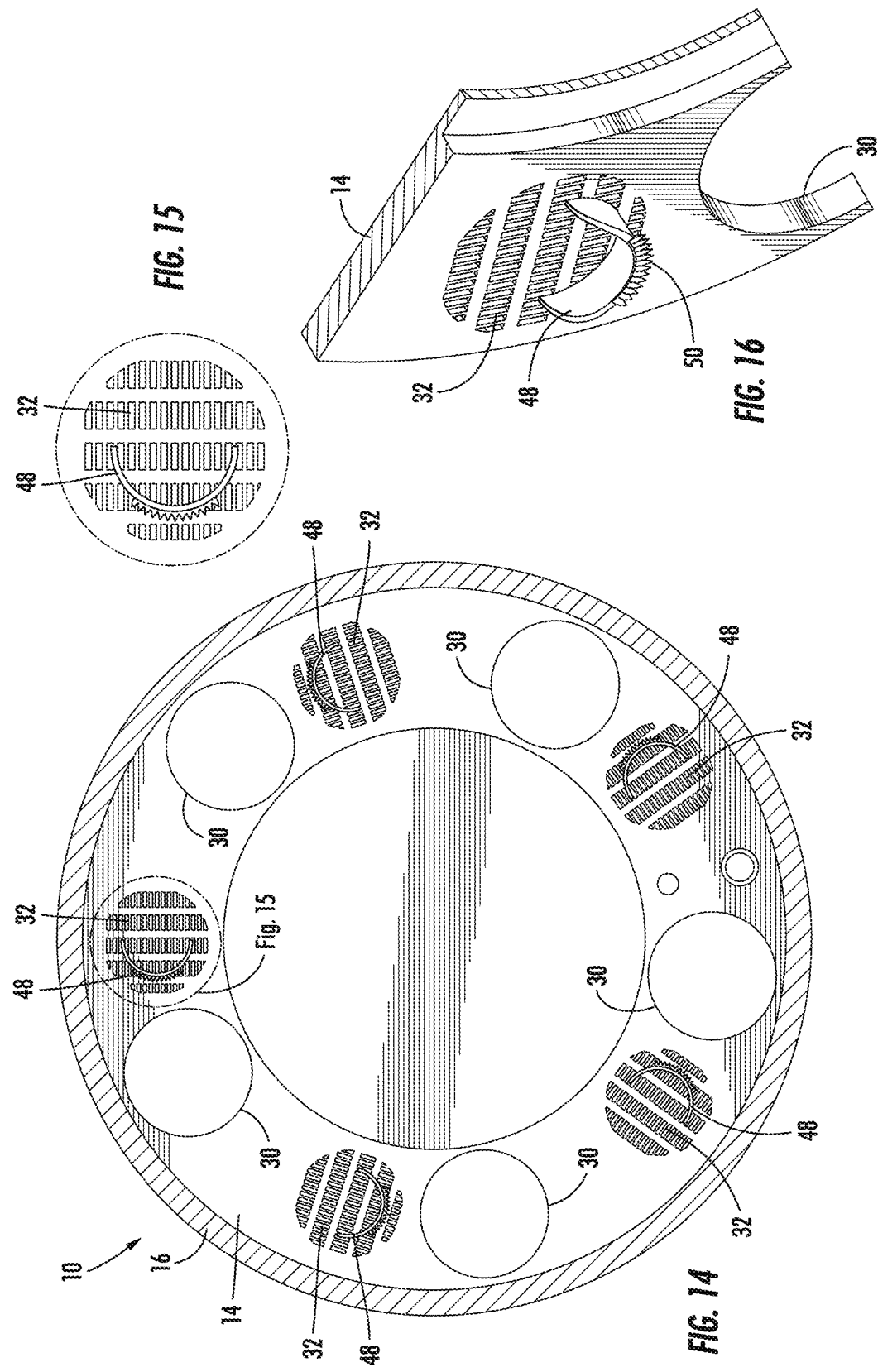

PET TOY

RELATED APPLICATIONS

This application claims the benefit of U.S. Provisional Application No. 63/627,727, filed Jan. 31, 2024, the contents of which provisional application are fully incorporated herein by reference.

BACKGROUND OF THE INVENTIONS

1. Field of the Inventions

The present inventions generally pertain to pet toys, and more particularly to the use of olfactory stimulation to encourage pets to play and to encourage pet training.

2. Description of the Related Art

Often times there are difficulties in traveling with a dog to different locations. These difficulties can stop the dog from experiencing different scents from all over the world. Some of these difficulties include, size restrictions for airline travel, breed restriction laws in certain localities, and dangers of transporting a pet. An example of a danger in transportation occurred in 2022. In 2022 an airline mistakenly loaded a dog onto the wrong flight and the dog ended up landing in Saudi Arabia instead of the intended destination of Nashville, Tennessee. The present inventions allow users to overcome these difficulties and allow their dog to smell the world by bringing all natural scented items from all over the globe to the comfort of their own home. The present inventions relate generally to the pet toy industry, specifically olfactory stimulation and motivating methods of playing regarding pets, such as dogs. The present inventions include a puzzle toy that uses olfactory stimulation to encourage play. The toy can also be used as a way to train pets to locate a scent.

As will become apparent from the following descriptions and discussion, the present inventions encompass novel and unique dog and pet toys.

SUMMARY OF THE INVENTIONS

In one aspect, the present inventions may include a pet toy comprising: a lower base including at least one serve capsule compartment for receiving a serve capsule, the serve capsule containing scented items and a top opening; a top plate secured to an upper surface of the lower base, and including at least one slot corresponding to the at least one serve capsule compartment; a vented plate disposed between and rotatable relative to the lower base and the top plate, the vented plate including at least one aperture corresponding to the at least one serve capsule compartment; and at least one inverted slidable cover slidably retained between the top plate and the vented plate for slidable movement along the at least one slot in the top plate, the at least one inverted slidable cover having a first position in which it is not disposed over the serve capsule in the at least one serve capsule compartment and a second position in which it is disposed over the serve capsule in the at least one serve capsule compartment. Another feature of this aspect of the present inventions may be that the serve capsule includes a top cover enclosing the top opening of the serve capsule. Another feature of this aspect of the present inventions may be that a lower surface of the vented plate includes at least one cutter corresponding to the at least one serve capsule compartment, wherein the cutter punctures the top cover of the serve capsule located within the at least one serve capsule compartment when the vented plate is moved from a first position to a second position. Another feature of this aspect of the present inventions may be that the top cover is removably attached to an upper edge of the serve capsule. Another feature of this aspect of the present inventions may be that the vented plate includes at least one vented section corresponding to the at least one aperture in the vented plate corresponding to the at least one serve capsule compartment, the vented plate having a first position in which the at least one aperture is positioned above the at least one serve capsule compartment and a second position in which the at least one vented section is positioned above the at least one serve capsule compartment. Another feature of this aspect of the present inventions may be that the top plate includes a lock latch slot, a first locking aperture, and a second locking aperture; and the vented plate includes a lock latch having a locking rod and a retention rod, the retention rod being disposed for movement along the lock latch slot, and the locking rod being engaged with the first locking aperture when the vented plate is in a first locked position corresponding to the first position in which the aperture is positioned above the at least one serve capsule compartment, and the locking rod being engaged with the second locking aperture when the vented plate is in a second locked position corresponding to the second position in which the vented section is positioned above the at least one serve capsule compartment. Another feature of this aspect of the present inventions may be that a floor surface of the at least one serve capsule compartment includes a registering protuberance having a registering shape, and a lower surface of the serve capsule includes a registering indentation having a shape matching the registering shape of the registering protuberance, the registering indentation on the serve capsule being engaged with the registering protuberance when the serve capsule is positioned in the at least one serve capsule compartment. Another feature of this aspect of the present inventions may be that the serve capsule is a cup having a bottom surface and a conical side wall extending upwardly therefrom to define the top opening, the conical side wall having an annular upper edge disposed in a plane that is tilted relative to the bottom surface of the cup. Another feature of this aspect of the present inventions may be that the at least one inverted slidable cover is a cylindrical cup having an upper enclosed end and a lower open end, the lower open end having an annular lip, the annular lip being disposed between the top plate and the vented plate adjacent inner edges of the at least one slot in the top plate.

In another aspect, the present inventions may include a pet toy comprising: a lower base including at least one serve capsule compartment for receiving a serve capsule, the serve capsule containing scented items and a top opening; a top plate secured to an upper surface of the lower base, and including at least one slot corresponding to the at least one serve capsule compartment; a vented plate disposed between and rotatable relative to the lower base and the top plate, the vented plate including at least one aperture and at least one vented section corresponding to the at least one serve capsule compartment, the vented plate having a first position in which the at least one aperture is positioned above the at least one serve capsule compartment and a second position in which the at least one vented section is positioned above the at least one serve capsule compartment; and at least one inverted slidable cover slidably disposed between the top plate and the vented plate for slidable movement along the at least one slot in the top plate, the at least one inverted slidable cover having a first position in which it is not disposed over the serve capsule in the at least one serve capsule compartment and a second position in which it is disposed over the serve capsule in the at least one serve capsule compartment. Another feature of this aspect of the present inventions may be that the serve capsule includes a top cover enclosing the top opening of the serve capsule. Another feature of this aspect of the present inventions may be that a lower surface of the vented plate includes at least one cutter corresponding to the at least one serve capsule compartment, wherein the cutter punctures the top cover of the serve capsule located within the at least one serve capsule compartment when the vented plate is moved from its first position to its second position. Another feature of this aspect of the present inventions may be that the at least one cutter is positioned adjacent the at least one vented section in the vented plate. Another feature of this aspect of the present inventions may be that the top cover is removably attached to an upper edge of the serve capsule. Another feature of this aspect of the present inventions may be that the top plate includes a lock latch slot, a first locking aperture, and a second locking aperture; and the vented plate includes a lock latch having a locking rod and a retention rod, the retention rod being disposed for movement along the lock latch slot, and the locking rod being engaged with the first locking aperture when the vented plate is in a first locked position corresponding to the first position in which the aperture is positioned above the at least one serve capsule compartment, and the locking rod being engaged with the second locking aperture when the vented plate is in a second locked position corresponding to the second position in which the vented section is positioned above the at least one serve capsule compartment. Another feature of this aspect of the present inventions may be that a floor surface of the at least one serve capsule compartment includes a registering protuberance having a registering shape, and a lower surface of the serve capsule includes a registering indentation having a shape matching the registering shape of the registering protuberance, the registering indentation on the serve capsule being engaged with the registering protuberance when the serve capsule is positioned in the at least one serve capsule compartment. Another feature of this aspect of the present inventions may be that the serve capsule is a cup having a bottom surface and a conical side wall extending upwardly therefrom to define the top opening, the conical side wall having an annular upper edge disposed in a plane that is tilted relative to the bottom surface of the cup. Another feature of this aspect of the present inventions may be that the at least one inverted slidable cover is a cylindrical cup having an upper enclosed end and a lower open end, the lower open end having an annular lip, the annular lip being disposed between the top plate and the vented plate adjacent inner edges of the at least one slot in the top plate.

In yet another aspect, the present inventions may include a serve capsule comprising: a cup having a bottom surface and a side wall extending upwardly therefrom to define a top opening; a top cover removably attached to an upper edge of the side wall to cover the top opening; and a plurality of scent items contained within the cup below the top cover for attracting the attention of an animal. Another feature of this aspect of the present inventions may be that the side wall is at least partially in the shape of one of a cylinder and a cone, the bottom surface of the cup includes an indentation having a registering shape, and the upper edge of the side wall is disposed in a plane that is tilted relative to the bottom surface of the cup.

Other features, aspects and advantages of the present inventions will become apparent from the following discussion and detailed description.

BRIEF DESCRIPTION OF THE DRAWINGS

FIG. 1 is a perspective view of a specific embodiment of a pet toy constructed in accordance with one aspect of the present inventions.

FIG. 2 is an exploded perspective view of the pet toy shown in FIG. 1. FIGS. 1 and 2 show the pet toy with specific embodiments of serve capsules disposed in corresponding compartments in a lower base of the pet toy, and with specific embodiments of inverted slidable covers in first positions in which the inverted slidable covers are not covering the serve capsules.

FIG. 3 is a top view of the pet toy shown in FIG. 1 showing the pet toy in a locked open position but without the serve capsules that are shown in FIGS. 1 and 2.

FIG. 4 is a cross-sectional view taken along line 4-4 of FIG. 3, and illustrates a side view in partial cross-section of the pet toy shown in FIG. 3.

FIG. 5 is a cross-sectional view taken along line 5-5, and illustrates a specific embodiment of a lock latch in a first locked position.

FIG. 6 is the same cross-sectional view as shown in FIG. 5, except in FIG. 5 the lock latch is shown in an unlocked position.

FIG. 7 is a top view of the pet toy as shown in FIG. 3, but now with the serve capsules installed in their respective compartments and before the serve capsules have been opened.

FIG. 8 is a cross-sectional view taken along line 8-8 of FIG. 7.

FIG. 8A is a bottom view of the serve capsule shown in FIG. 8 and illustrates a shape, here an arrow, that may be used to register and align the serve capsule with a corresponding shape in a lower surface of its corresponding serve capsule compartment.

FIG. 9 is an enlarged view of a portion of FIG. 8 as indicated to show a specific embodiment of a removable cover attached to an upper rim of the serve capsule before the cover has been punctured or opened to release the scent from odor emitting objects contained within the serve capsules.

FIG. 12 is another top view similar to FIG. 10, except this view shows the lock latch in a second locked position corresponding to the vented plate having been moved into its closed position, at which time its vented sections are disposed above corresponding serve capsules, which have now been punctured or opened by cutters extending downwardly from the vented sections of the vented plate. This view shows four of the inverted slidable covers moved into second or covering positions, but with one of the inverted slidable covers still in its first position so as to not cover up one of the vented sections of the vented plate positioned above one of the serve capsules.

FIG. 12A is another top view similar to FIG. 12. However, for the four serve capsules that are shown covered in FIG. 12, the inverted slidable covers and corresponding vented sections in the vented plate are not shown in order to show openings that have been cut in the lids of the serve capsules by the cutters attached to the lower surface of the vented plate.

FIG. 13 is a cross-sectional view taken along line 13-13 of FIG. 12.

FIG. 14 is a cross-sectional view taken along line 14-14 of FIG. 13 to illustrate a view looking up at the bottom of the vented plate when it is positioned as shown in FIG. 13.

FIG. 15 is an enlarged view of the portion indicated in FIG. 14 to illustrate a specific embodiment of a cutter extending downwardly from the lower surface of the vented plate.

FIG. 16 is a perspective view of the cutter shown in FIG. 15.

Figure 11:
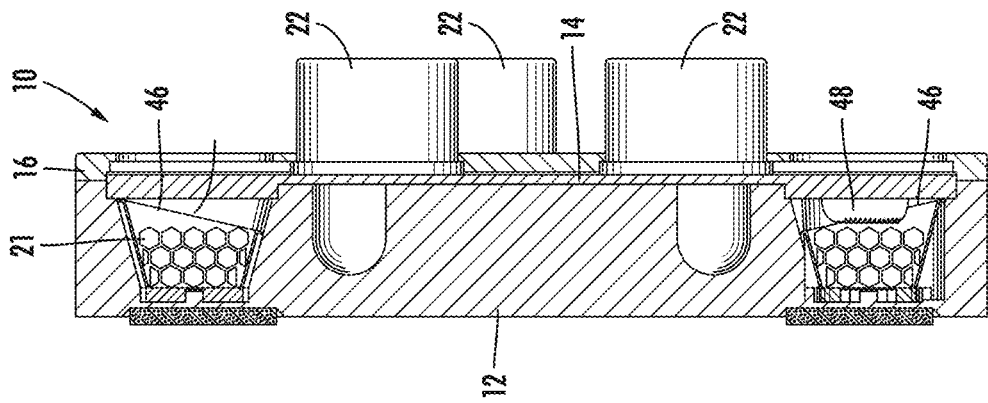
FIG. 11 is a cross-sectional view take along line 11-11 of FIG. 10.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

The present inventions will be described in various representative embodiments, as explained below. However, the scope of the present inventions is not limited to any of the details of the embodiments discussed below. Reference should be made to the appended claims, each of which defines a separate and distinct invention that is part of the present inventions.

Referring to the drawings in detail, wherein like numerals denote identical elements throughout the several views, and referring initially to FIG. 1, there is shown a perspective view a specific embodiment of a pet toy 10. FIG. 2 is an exploded view of the pet toy 10 shown in FIG. 1. With reference to FIGS. 1 and 2, it can be seen that the pet toy 10 may include a lower base 12, a vented plate 14, and a top plate 16. The vented plate 14 is disposed between, and rotatable relative to, the lower base 12 and the top plate 16. The lower base 12 and the top plate 16 are secured to one another, such as with screws or bolts 17 that may be threadably engaged with threaded bores in a lower surface of the top plate 16. The lower base 12 may include rubber feet 13 attached to a lower surface of the lower base 12 to prevent it from sliding along a floor surface. The lower base 12 includes at least one serve capsule compartment 18 adapted for housing a corresponding serve capsule 20. In a specific embodiment, the pet toy 10 may include five serve capsules 20 and five corresponding serve capsule compartments 18; however, the present inventions are not limited to any particular number of serve capsules 20 and corresponding serve capsule compartments 18.

In a specific embodiment, as shown for example in FIG. 2, each serve capsule 20 may be a cup having a bottom surface and a cylindrical or conical side wall extending upwardly therefrom to define a top opening. An upper annular edge of the side wall may be disposed within a plane that may be tilted or at an angle relative to the bottom surface of the cup. In a specific embodiment, the serve capsules 20 may be cups of the type available online and in stores that contain coffee and are adapted for use with popular coffee machines. As will be discussed below, the serve capsules 20 hold the scented or odor emitting items that are intended to attract the attention of pets when the pet toy 10 is in use. The pet toy 10 may include an inverted slidable cover 22 corresponding to each serve capsule compartment 18, and may be moveable between a first position, as shown in FIG. 1, and a second position (as shown in FIG. 12 and discussed below). In a specific embodiment, each inverted slidable cover 22 may be in the form of a cylindrical cup having an annular lip 24 adjacent an open end of the cover 22. The purpose of the annular lip 24 will be described below.

The top plate 16 includes a slot 26 corresponding to each of the serve capsule compartments 18. In a specific embodiment, each slot 26 may have a first end disposed adjacent a central portion of the top plate 16 and may extend outwardly away therefrom toward an outer peripheral surface 28 of the top plate 16. The purpose of the slots 26 is to provide a track along which the inverted slidable covers 22 may move. The slidable covers 22 are positioned upside down, i.e., with the opening facing downwardly toward the vented plate 14. The cylindrical bodies of the covers 22 are sized to fit within the slots 26. The annular lips 24 on the slidable covers 22 are sized so as to extend past outer edges of the slots 26 and be disposed between a lower surface of the top plate 16 and an upper surface of the vented plate 14. In this manner, the slidable covers 22 are secured to the pet toy 10 and allowed to freely slide along the slots 26.

In a specific embodiment, the vented plate 14 may include at least one circular opening or aperture 30. In another specific embodiment, the vented plate 14 may include pairs of circular openings or apertures 30 and vented sections 32. As best shown in FIGS. 5 and 6 in connection with FIGS. 1-3, in a specific embodiment, the vented plate 14 may also include a lock latch 34 that may include a locking rod 36 and a retention rod 38. The retention rod 38 may include a head portion 39 defining an annular lip. The retention rod 38 may be disposed through a lock latch aperture in the vented plate 14 and a lock latch slot 40 in the top plate 16. The head portion 39 of the retention rod 38 is sized and positioned so as to come into contact with a lower surface of the vented plate 14 and retain the retention rod 38 within the lock latch aperture in the vented plate 14. In a specific embodiment, the lock latch slot 40 in the top plate 16 may have an arcuate shape and may be disposed near the outer peripheral surface 28 of the top plate 16. The top plate 16 may also include a first locking aperture 42 and a second locking aperture 44, each of which is adapted for removable engagement with the locking rod 36 on the lock latch 34.

The vented plate 14 may also include a lower locking aperture 43 (shown in FIGS. 2 and 6) that aligns with the first locking aperture 42 when the vented plate 14 is in its locked open position, and that aligns with the second locking aperture 44 when the vented plate 14 is in its locked closed position. When the vented plate 14 is in its locked open position, the locking rod 36 on the lock latch 34 is inserted through the first locking aperture 42 and into the lower locking aperture 43 to lock the vented plate 14 to the top plate 16 when the circular openings 30 in the vented plate 14 are positioned above the serve capsule compartments 18. When the vented plate 14 is in its locked closed position, the locking rod 36 on the lock latch 34 is inserted through the second locking aperture 44 and into the lower locking aperture 43 to lock the vented plate 14 to the top plate 16 when the vented sections 32 in the vented plate 14 are positioned above the serve capsule compartments 18.

With reference to FIG. 1, the pet toy 10 is shown in an open position, meaning that the serve capsule compartments 18 are unobstructed and accessible, such as to insert or remove a serve capsule 20. When in this locked open position, the inverted slidable covers 22 are moved toward the center of the top plate 16 and away from the circular openings 30 in the top plate 16 and away from the serve capsules 20. When in this position, the lock latch 34 is positioned at a first end of the lock latch slot 40 and the locking rod 36 of the lock latch 34 is engaged with the first locking aperture 42 in the top plate 16. It can also be seen that when the pet toy 10 is in the position as shown in FIG. 1, one of the vented sections 32 can be seen through the lock latch slot 40. The other vented sections 32 in the vented plate 14 are hidden underneath the top plate 16.

FIG. 3 is a top view of the pet toy 10 shown in FIG. 1 and in the same position. However, FIG. 3 does not show any serve capsules 20 in the serve capsule compartments 18. In FIG. 3, it can be seen that, in a specific embodiment, lower or floor surfaces of the serve capsule compartments 18 may include a protruding shape 19 adapted for engagement with a corresponding recess or indentation 23 of the same shape in a lower surface of the serve capsules 20 (see FIG. 8A). In a specific embodiment, the shape of the protuberance 19 and corresponding indentation 23 may be in the form of an arrow. When the serve capsules 20 are positioned in the serve capsule compartments 18, the indentations 23 in the lower surfaces of the serve capsules 20 are engaged with the corresponding protuberances 19 in the floor surface of the serve capsule compartments 18. In a specific embodiment, when the protuberances 19 and indentations 23 are engaged, the serve capsules 20 may be oriented in a desired direction, such as with the inclined or tilted top covers 46 on the serve capsules 20 facing toward the cutters 48 described below. FIG. 3 also shows four of the vented sections 32 in the vented plate 14 in dashed lines so they are visible below the top plate 16.

Referring now to FIG. 7, another top view of the pet toy 10 is shown. This view is the same as FIG. 3, except that now sealed/unopened serve capsules 20 are shown positioned in the serve capsule compartments 18. The contents of the serve capsules 20 is indicated by hexagons in dashed lines, which may be any scented items or odor emitting items 21 that may be provided for the purpose of attracting interest of a pet playing with the pet toy 10. The contents are shown in solid lines in FIG. 8. FIGS. 8 and 9 also show a top cover 46 that may be secured to an upper surface of side walls (such as an upper annular edge) of the serve capsules 20.

Figure 10:
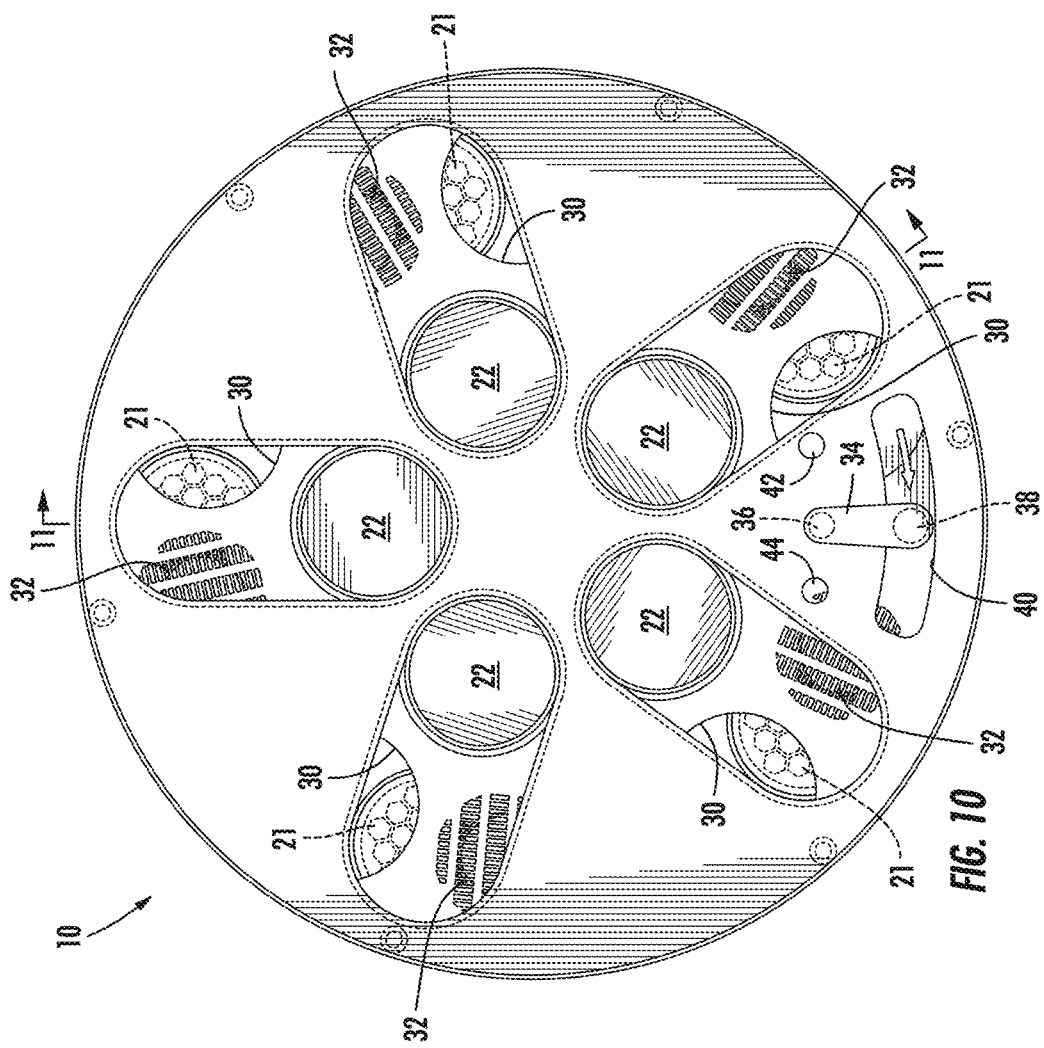
FIG. 10 is another top view very similar to FIG. 8, except this view shows the lock latch in its unlocked position and a specific embodiment of a vented plate being moved from an open position to a closed position.

Referring now to FIG. 10, the pet toy 10 is shown in the process of being moved from its locked open position to a locked closed position. It can be seen in FIG. 10 that the locking rod 36 has been disengaged from the first locking aperture 42 in the top plate 16, and the latch lock 34 has been moved to the left along the lock latch slot 40. It can also be seen that the circular openings 30 and their corresponding vented sections 32 in the top plate 16 have also been moved to the left, and each is partially positioned over their corresponding serve capsules 20. The inverted slidable covers 22 are still positioned near the center of the pet toy 10.

Referring to FIG. 11, a cutter 48 is shown moving toward contact with the top cover 46 of the serve capsule 20.

Referring now to FIG. 12, the lock latch 34 has been moved all the way to the left of the lock latch slot 40 and the locking rod 36 on the lock latch 34 is engaged with the second locking aperture 44 to lock the top plate 16 in its second or closed position. In this position, the vented sections 32 of the top plate 16 are now positioned directly over the serve capsules 20. This can be seen with respect to one of the vented sections 32 for which its corresponding inverted slidable cover 22 has not be moved from its position near the center of the pet toy 10. The other four slidable covers 22 shown in FIG. 12 have been moved to their outer positions where they are positioned over and covering their corresponding vented section 32 and serve capsule 20. In the position as shown in FIG. 12, as best seen in FIG. 13, the cutters 48 have now made contact with and punctured the top covers 46 of the serve capsules 20, thereby releasing the scent of the scented items 21 and allowing that scent or those scents to emanate through the vented sections 32 to be sensed by a pet playing with the pet toy 10. Note that if an inverted slidable cover 22 is positioned over its corresponding serve capsule 20, then the odor emanating from that serve capsule 20 will be at least partially obstructed by the slidable cover 22.

Referring to FIG. 12A, the pet toy 10 is shown with the top plate 16 in its second or locked closed position. FIG. 12A is similar to FIG. 12, except that the four slidable covers 22 shown in their covering positions as shown in FIG. 12 are not shown in FIG. 12A, and the vented sections 32 corresponding to those four covers 22 are also not shown. The reason for this is so the tops of the serve capsules 20 corresponding to those four covers 22 can be seen, and more particularly, so the now opened or punctured top covers 46 (caused by the cutters 48) for those serve capsules 20, and the contents 21 thereof, can be seen.

Referring now to FIG. 14, what is shown is a cross-sectional view taken along line 14-14 of FIG. 13. This view shows a bottom view of the lower surface of the top plate 16. The cutters 48 can be seen in FIG. 14. In a specific embodiment, the cutters 48 may be positioned adjacent corresponding vented sections 32. More detailed views of the cutters 48 are shown in FIGS. 15 and 16. In a specific embodiment, each cutter 48 may include an arcuate wall extending away from its corresponding vented section 32, and may include a plurality of teeth 50 disposed on a distal or lowermost edge thereof. In a specific embodiment, the teeth 50 may be facing the circular opening 30 corresponding to its vented section 32. The arcuate wall of each cutter 48 may be provided with a height that will position its corresponding teeth 50 to engage with and cut open the inclined top cover 46 of its corresponding serve capsule 20 when the vented plate 14 is rotated into its position as shown in FIGS. 12 and 12A.

Figure 19:
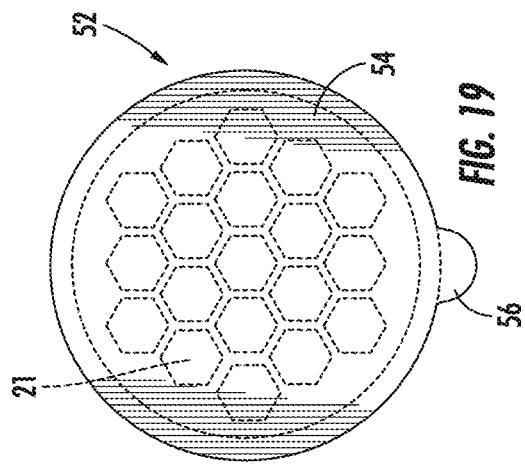
FIG. 19 is a top view of the serve capsule shown in FIG. 18, with the removable lid still disposed over the top of the serve capsule.
Figure 21:
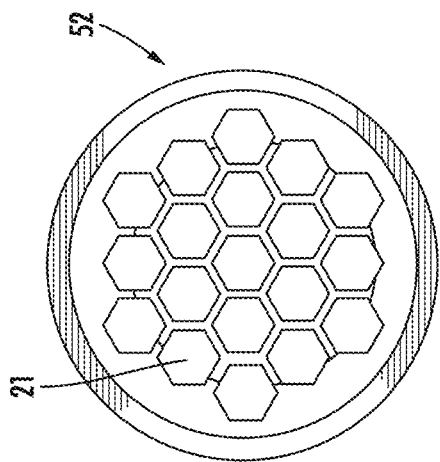
FIG. 21 is a top view of the serve capsule as shown in FIG. 20.
Figure 18:
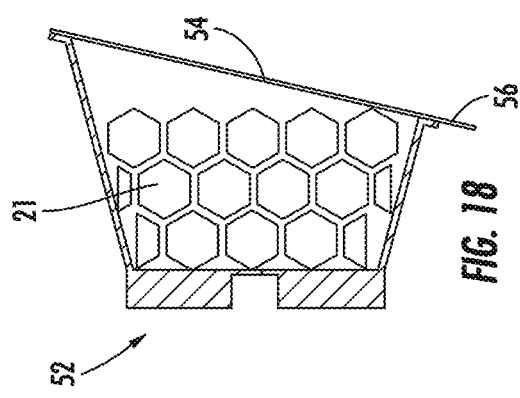
FIG. 18 is a side view of the serve capsule shown in FIG. 17 with a removable lid disposed over the top of the serve capsule.
Figure 20:
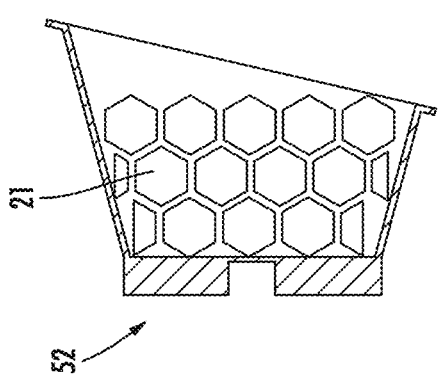
FIG. 20 is a side view of the serve capsule shown in FIG. 18, but now with the removable lid removed.
Figure 17:
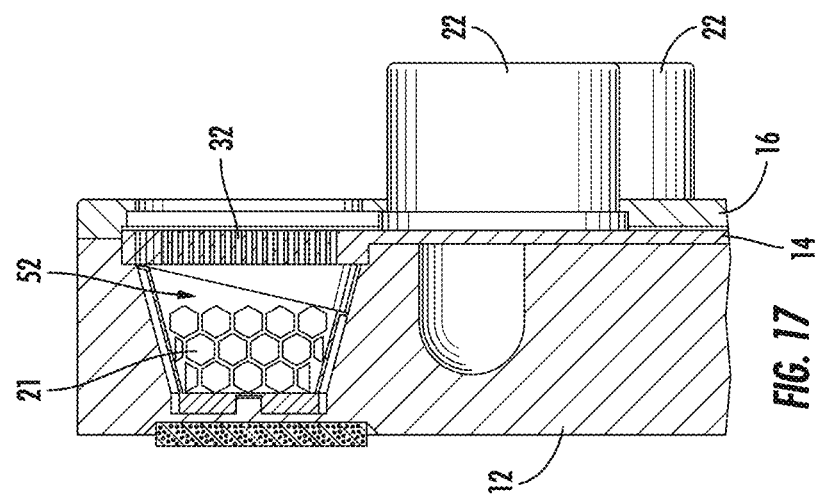
FIG. 17 is a side view in partial cross-section showing another specific embodiment of a serve capsule.

Referring now to FIGS. 17-21, an alternative embodiment of a serve capsule 52 is shown. The difference between the serve capsules 20 described above and the serve capsule 52 shown here in FIGS. 17-21 relates to the manner in which the serve capsule is covered. With the serve capsules 20 described above, each serve capsule 20 is covered by a top cover 46 that is "opened" when it is punctured with the cutter teeth 50. With the serve capsule 52 shown in FIGS. 17-21, the serve capsule 52 is covered or sealed by a removable or peelable cover 54. The serve capsule 52 is shown in FIGS. 18 and 19 with the removable or peelable cover 54 secured to the top of the serve capsule 52. In a specific embodiment, as shown in FIGS. 18 and 19, the removable/peelable cover 54 may include a tab 56 that one can grasp to pull and remove the cover 54 from the serve capsule 52. FIGS. 20 and 21 show the serve capsule 52 after the cover 54 has been removed, at which time the top of the serve capsule 52 is completely open to allow the odors from the scented items 21 to freely emanate from the top of the serve capsule. FIG. 17 shows the serve capsule 52 positioned in the lower base 12 after the cover 54 has been removed from the serve capsule.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. It should also be understood that various features and aspects of the various embodiments discussed above and illustrated in the Figures may be selectively incorporated with and/or removed from a specific embodiment to arrive at another specific embodiment. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A pet toy comprising:
   a lower base including at least one serve capsule compartment for receiving a serve capsule, the serve capsule containing scented items and a top opening;
   a top plate secured to an upper surface of the lower base, and including at least one slot corresponding to the at least one serve capsule compartment;
   a vented plate disposed between and rotatable relative to the lower base and the top plate, the vented plate including at least one aperture corresponding to the at least one serve capsule compartment; and
   at least one inverted slidable cover slidably retained between the top plate and the vented plate for slidable movement along the at least one slot in the top plate, the at least one inverted slidable cover having a first position in which it is not disposed over the serve capsule in the at least one serve capsule compartment and a second position in which it is disposed over the serve capsule in the at least one serve capsule compartment.

2. The pet toy of claim 1, wherein the serve capsule includes a top cover enclosing the top opening of the serve capsule.

3. The pet toy of claim 2, wherein a lower surface of the vented plate includes at least one cutter corresponding to the at least one serve capsule compartment, wherein the cutter punctures the top cover of the serve capsule located within the at least one serve capsule compartment when the vented plate is moved from a first position to a second position.

4. The pet toy of claim 2, wherein the top cover is removably attached to an upper edge of the serve capsule.

5. The pet toy of claim 1, wherein the vented plate includes at least one vented section corresponding to the at least one aperture in the vented plate corresponding to the at least one serve capsule compartment, the vented plate having a first position in which the at least one aperture is positioned above the at least one serve capsule compartment and a second position in which the at least one vented section is positioned above the at least one serve capsule compartment.

6. The pet toy of claim 5, wherein:
   the top plate includes a lock latch slot, a first locking aperture, and a second locking aperture; and
   the vented plate includes a lock latch having a locking rod and a retention rod, the retention rod being disposed for movement along the lock latch slot, and the locking rod being engaged with the first locking aperture when the vented plate is in a first locked position corresponding to the first position in which the aperture is positioned above the at least one serve capsule compartment, and the locking rod being engaged with the second locking aperture when the vented plate is in a second locked position corresponding to the second position in which the vented section is positioned above the at least one serve capsule compartment.

7. The pet toy of claim 1, wherein a floor surface of the at least one serve capsule compartment includes a registering protuberance having a registering shape, and a lower surface of the serve capsule includes a registering indentation having a shape matching the registering shape of the registering protuberance, the registering indentation on the serve capsule being engaged with the registering protuberance when the serve capsule is positioned in the at least one serve capsule compartment.

8. The pet toy of claim 1, wherein the serve capsule is a cup having a bottom surface and a conical side wall extending upwardly therefrom to define the top opening, the conical side wall having an annular upper edge disposed in a plane that is tilted relative to the bottom surface of the cup.

9. The pet toy of claim 1, where in the at least one inverted slidable cover is a cylindrical cup having an upper enclosed end and a lower open end, the lower open end having an annular lip, the annular lip being disposed between the top plate and the vented plate adjacent inner edges of the at least one slot in the top plate.

10. A pet toy comprising:
    a lower base including at least one serve capsule compartment for receiving a serve capsule, the serve capsule containing scented items and a top opening;
    a top plate secured to an upper surface of the lower base, and including at least one slot corresponding to the at least one serve capsule compartment;
    a vented plate disposed between and rotatable relative to the lower base and the top plate, the vented plate including at least one aperture and at least one vented section corresponding to the at least one serve capsule compartment, the vented plate having a first position in which the at least one aperture is positioned above the at least one serve capsule compartment and a second position in which the at least one vented section is positioned above the at least one serve capsule compartment; and
    at least one inverted slidable cover slidably disposed between the top plate and the vented plate for slidable movement along the at least one slot in the top plate, the at least one inverted slidable cover having a first position in which it is not disposed over the serve capsule in the at least one serve capsule compartment and a second position in which it is disposed over the serve capsule in the at least one serve capsule compartment.

11. The pet toy of claim 10, wherein the serve capsule includes a top cover enclosing the top opening of the serve capsule.

12. The pet toy of claim 11, wherein a lower surface of the vented plate includes at least one cutter corresponding to the at least one serve capsule compartment, wherein the cutter punctures the top cover of the serve capsule located within the at least one serve capsule compartment when the vented plate is moved from its first position to its second position.

13. The pet toy of claim 12, wherein the at least one cutter is positioned adjacent the at least one vented section in the vented plate.

14. The pet toy of claim 11, wherein the top cover is removably attached to an upper edge of the serve capsule.

15. The pet toy of claim 10, wherein:
the top plate includes a lock latch slot, a first locking aperture, and a second locking aperture; and
the vented plate includes a lock latch having a locking rod and a retention rod, the retention rod being disposed for movement along the lock latch slot, and the locking rod being engaged with the first locking aperture when the vented plate is in a first locked position corresponding to the first position in which the aperture is positioned above the at least one serve capsule compartment, and the locking rod being engaged with the second locking aperture when the vented plate is in a second locked position corresponding to the second position in which the vented section is positioned above the at least one serve capsule compartment.

16. The pet toy of claim 10, wherein a floor surface of the at least one serve capsule compartment includes a registering protuberance having a registering shape, and a lower surface of the serve capsule includes a registering indentation having a shape matching the registering shape of the registering protuberance, the registering indentation on the serve capsule being engaged with the registering protuberance when the serve capsule is positioned in the at least one serve capsule compartment.

17. The pet toy of claim 10, wherein the serve capsule is a cup having a bottom surface and a conical side wall extending upwardly therefrom to define the top opening, the conical side wall having an annular upper edge disposed in a plane that is tilted relative to the bottom surface of the cup.

18. The pet toy of claim 10, where in the at least one inverted slidable cover is a cylindrical cup having an upper enclosed end and a lower open end, the lower open end having an annular lip, the annular lip being disposed between the top plate and the vented plate adjacent inner edges of the at least one slot in the top plate.

* * * * *